United States Patent [19]

Patil et al.

[11] Patent Number: 5,582,003

[45] Date of Patent: Dec. 10, 1996

[54] TEMPERATURE ACTUATED ZEOLITE IN-LINE ADSORBER SYSTEM

[75] Inventors: Mallanagouda D. Patil, Corning; Jimmie L. Williams, Painted Post, both of N.Y.

[73] Assignee: Corning Incorporated, Corning, N.Y.

[21] Appl. No.: 234,680

[22] Filed: Apr. 28, 1994

[51] Int. Cl.⁶ ................................................. F01N 3/28
[52] U.S. Cl. ............................... 60/284; 60/288; 60/297
[58] Field of Search ............................. 60/284, 297, 288

[56] References Cited

U.S. PATENT DOCUMENTS

| | | | |
|---|---|---|---|
| 4,196,170 | 4/1980 | Cemenska | 422/171 |
| 4,625,511 | 12/1986 | Scheitlin et al. | 60/299 |
| 5,051,244 | 9/1991 | Dunne | 60/297 |
| 5,089,236 | 2/1992 | Clerc | 422/177 |
| 5,125,231 | 6/1992 | Patil et al. | 60/297 |
| 5,144,796 | 9/1992 | Swars | 60/288 |
| 5,211,012 | 5/1993 | Swars | 60/295 |
| 5,271,906 | 12/1993 | Yuuki et al. | 60/297 |
| 5,315,824 | 5/1994 | Takeshima . | |
| 5,373,696 | 12/1994 | Adamczyk | 60/289 |

FOREIGN PATENT DOCUMENTS 2254014  9/1992  United Kingdom .

*Primary Examiner*—Douglas Hart
*Attorney, Agent, or Firm*—Timothy M. Schaeberle

[57] ABSTRACT

A engine exhaust system is disclosed for reducing the amount of hydrocarbons emitted during engine start-up (cold-start), before the catalytic converter has attained its effective operating temperature. The system includes a flow control device, in particular a bi-metallic flap, occupying a first position at the first temperature to direct substantially all of the engine exhaust through a molecular sieve structure to adsorb the hydrocarbons, and a second position at the second temperature, to direct the engine exhaust stream directly from the light-off catalyst to the burnoff catalyst, bypassing the molecular sieve structure.

15 Claims, 4 Drawing Sheets

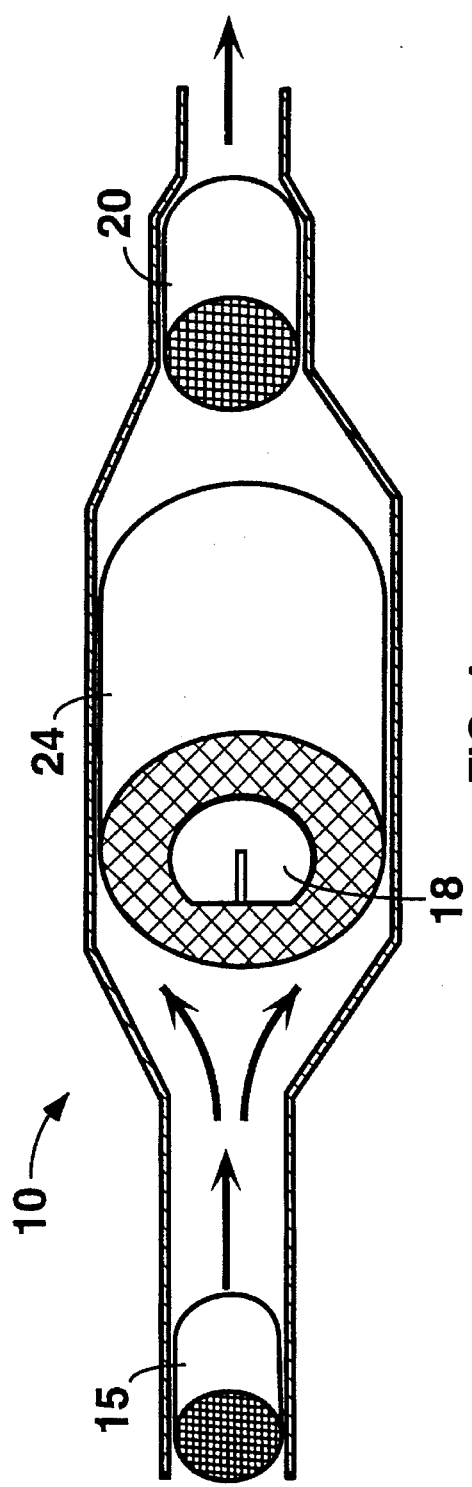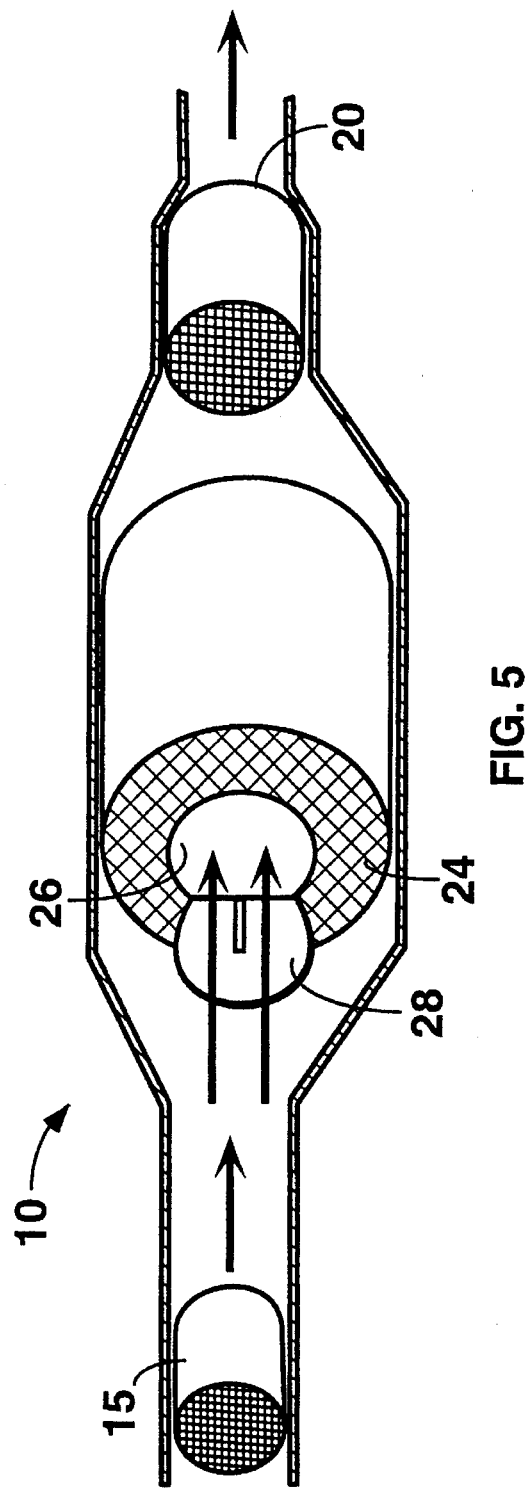

TEMPERATURE ACTUATED ZEOLITE IN-LINE ADSORBER SYSTEM

BACKGROUND OF THE INVENTION

The present invention relates to a passive in-line adsorber system capable of meeting the ultra-low emission vehicle (ULEV) standards by utilizing a combination of light-off catalyst, a burn-off catalyst, a hydrocarbon adsorber, and optionally, a three-way catalyst as a main converter.

Internal combustion engines emit large amounts of unburned hydrocarbons during the cold start of an engine due to the rich fuel mixture used in such engines, and the necessarily incomplete combustion at start-up. This emission of unburned hydrocarbons continues until the main catalyst reaches its "light-off" temperature, at which point the catalyst begins to convert the hydrocarbons to harmless gases. It has been determined that the typical light-off times for most internal combustion engines are around 50 to 120 seconds, during which time significant amounts of hydrocarbons are emitted into the atmosphere. The actual light-off time for any system will depend on the position of the catalyst relative to the engine, as well as the noble metal loading.

While catalytic converters are well known for reducing oxides of nitrogen (NOx), and oxidizing hydrocarbons and carbon monoxide from automobile exhaust, these reactions typically take place at temperatures of 300° C. or higher. However, to increase the effectiveness of automotive emission control systems, at much lower temperature, that is, during cold start, a significant amount of hydrocarbons must be adsorbed and held until the converter attains its light-off temperature.

In the past, attempts have been made to improve efficiency using complex and expensive valving systems, or by using multiple catalysts placed in series along the exhaust stream path. Others have attempted to deal with the above problems by splitting the exhaust stream into equal portions which are directed to different converters or filters. Still, others have disclosed a multiple catalytic converter system in which flow of the exhaust gas is controlled to each converter using a pressure sensitive flow control valve.

A system has also been disclosed in which the amount of hydrocarbons entrained in exhaust gas is reduced at low temperatures and during low engine load conditions by passing the exhaust gas through a catalytic bed of sufficient volume having low space velocities to ensure that the exhaust gas remains in contact with the catalyst bed for a predetermined period of time to ensure adequate conversion. At high engine temperatures and high engine loads, the gas is passed through a small volume catalytic converter of high space velocities to allow only minimal contact with catalyst bed. The control mechanism for directing the exhaust gas flow includes a valve and an electronic control system for controlling the valve. None of the above systems provide for purification by adsorbing and desorbing the hydrocarbons at appropriate intervals.

Recently, several methods have been proposed for trapping or removing these unburned hydrocarbons, including zeolite traps, carbon traps and electrically heated catalysts. For example, a system has been disclosed which includes a hydrocarbon adsorbing material made up of a substrate coated with mixed powders of ZSM-5 zeolite ion-exchanged with Cu and Pd, and placed inline and upstream from a Pt/Rh catalyst.

More recently, co-pending, co-assigned application Ser. Nos. 08/106,512 and 08/106,514 have disclosed novel approaches for improving the capacity of zeolites to adsorb a broad range of hydrocarbons using modified zeolites. For the most part, many of the above systems rely on complex valving systems for exhaust gas flow. Since the effectiveness of the catalytic converter, at least with respect to hydrocarbon conversion varies with engine operating conditions such as temperature and engine speed, there continues to be a need for engine exhaust systems which are capable to adjusting effectiveness based on prevailing engine operating conditions.

Accordingly, it is the object of the present invention to provide a better and improved engine exhaust system for reducing or removing unburned hydrocarbons from exhaust emissions, particularly during cold-start.

SUMMARY OF THE INVENTION

The invention relates to an engine exhaust system for treating hydrocarbon-containing engine exhaust stream using a light-off catalyst, a housing downstream of the light-off catalyst, and a burnoff catalyst downstream of the housing. The housing includes a molecular sieve structure for adsorbing hydrocarbons from the engine exhaust stream at temperatures below a first temperature, and a flow control device for directing and controlling the flow of exhaust stream through the molecular sieve structure. At a second temperature higher than the first temperature, the molecular sieve structure desorbs the hydrocarbons which are then converted to water and carbon dioxide by the burn-off catalyst under redox conditions. The flow control device operates to direct flow through the housing by occupying a first position to direct all or substantially all of the exhaust stream through the molecular sieve structure, and a second position to direct a major or substantial portion of the exhaust stream away from the molecular sieve structure, thereby effectively directing most of the exhaust stream from the light-off catalyst to the burnoff catalyst, either directly or through an optional main catalytic converter or three-way catalyst which may also be positioned within the housing as shown in FIG. 2.

As used in this specification:

"high-silica zeolite" refers to those zeolites having a $SiO_2/Al_2O_3$ molar ratio which exceeds about 10 and for some applications, greater than 100; any silica/alumina ratio can be used in this invention, however, it is preferable to use high or very high silica/alumina ratio for thermal stability;

"molecular sieve" refers to crystalline substances or structures having pore sizes suitable for adsorbing molecules. The term is generally used to describe a class of materials that exhibit selective absorptions properties. To be a molecular sieve, the material must separate components of a mixture on the basis of molecular size and shape differences. Such materials include silicates, the metallosilicates, metalloaluminates, the $AlPO_4$s, silico- and metalloaluminophosphates, zeolites and others described in R. Szostak, *Molecular Sieves: Principles of Synthesis and Identification*, pages 2–6 (Van Nostrand Reinhold Catalysis Series, 1989);

"zeolites" are crystalline aluminosilicates whose structures are based on a theoretically limitless three-dimensional network of $AlO_x$ and $SiO_y$ tetrahedra linked by the sharing of oxygen atoms, such as more fully disclosed in U.S. Pat. No. 3,702,886, in British Specification No. 1,334,243, published Oct. 17, 1973, in U.S. Pat. No. 3,709,979, and in U.S. Pat. No. 3,832,449, all of which are herein incorporated by reference;

"light-off temperature" of a converter is the temperature at which a catalytic converter can convert 50% of carbon monoxide or hydrocarbons or NOx;

"monolithic substrate" is any unitary body or substrate formed from, or incorporating molecular sieve material; as used herein, a honeycomb substrate is a form of a monolithic substrate, but a monolithic substrate is not necessarily a honeycomb substrate; and oxidation of desorbed hydrocarbons takes place in the "burn-off" catalyst which can also function as a three-way catalyst to convert oxides of nitrogen (NOx), and carbon monoxide, in addition to hydrocarbons; if necessary, additional air is added to bring the redox ratio to levels needed to convert the noxious gases to harmless gases.

BRIEF DESCRIPTION OF THE DRAWINGS

FIG. 4 is a sectional view of another configuration of the invention in which the adsorber is a honeycomb structure having a core; in this first (closed) position, the bi-metallic flap covers the core to direct substantially all of the exhaust stream through the adsorber;

FIG. 5 is a sectional view of the configuration of FIG. 4, showing the bi-metallic flap in the second (open) position which directs a substantial amount of the exhaust stream through the open core, substantially bypassing the adsorber.

Reference Numerals in the Drawings

10 . . . exhaust system;
12 . . . housing;
14,24 . . . adsorber;
15 . . . light-off catalyst;
16 . . . open or free flow region;
17 . . . bi-metallic strip;
18,28 . . . flow control device (or bi-metallic flap);
19 . . . dividing wall;
20 . . . burnoff catalyst;
22 . . . main catalytic converter or three-way catalyst; and
26 . . . hollow core.

DETAILED DESCRIPTION OF THE INVENTION

As contemplated by the invention, the molecular sieve structure is a hydrocarbon adsorber which, at low temperatures, adsorbs and "holds" a substantial portion of the hydrocarbon emissions generated during start-up of the engine. Typically, at these low temperatures, the burn-off catalyst and/or the main catalytic converter have not attained their effective operating temperatures. Upon engine start-up (i.e., at cold-start), the generated hydrocarbons will begin to be adsorbed. Such adsorption continues until the burn-off catalyst has attained its effective operating temperature, at which time the hydrocarbons are then desorbed from the molecular sieve adsorber. Desorption of the hydrocarbons from the molecular sieve commences when the molecular sieve attains its desorption temperature, and desorption is generally complete by the time the molecular sieve (adsorber) reaches a temperature of about 300 to 400° C.

Figure 1A:
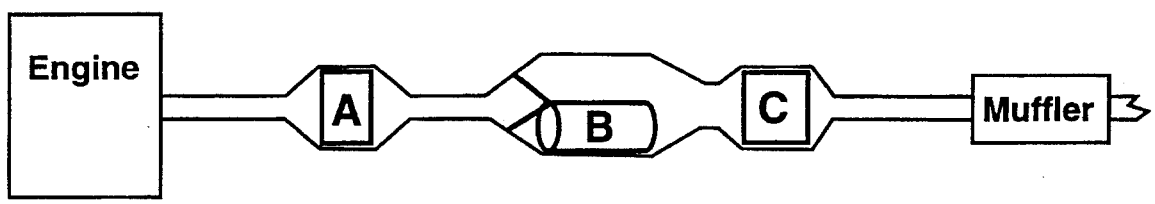
FIG. 1a is a schematic diagram of the exhaust system of the invention.
Figure 1B:
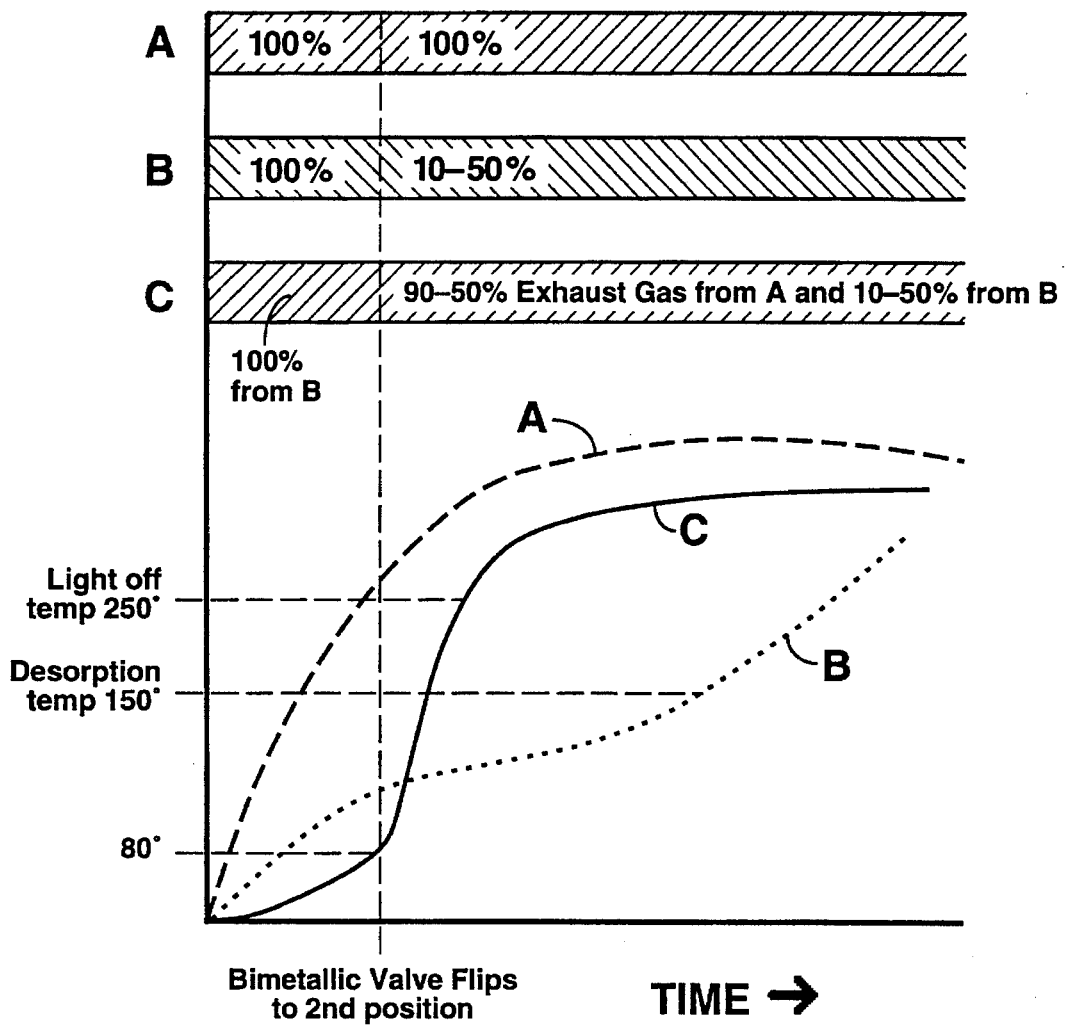
FIG. 1b is a graph illustrating, as a function of time, the relative temperatures attained by the light-off catalyst, the burn-off catalyst, the adsorber, and any additional three-way catalyst.

The catalysts typically utilized in automotive catalytic converters generally have light-off temperatures in the range of about 200 to 400° C. Hydrocarbons begin to desorb from the zeolite at a temperature below the light-off temperature of the catalyst. Therefore, a special engine exhaust system design should be utilized which enables the zeolite to "hold" the adsorbed hydrocarbons until the catalyst has reached its light-off temperature and then "release" the hydrocarbons to the burn-off catalyst for conversion. FIG. 1a is an illustrative diagram of the special exhaust system 10 of the invention. It is essential that, as soon after engine start-up as possible, the light-off catalyst attains its effective (light-off) temperature. The relative temperatures of the adsorber and the burn-off catalyst, as a function of time, are shown in FIG. 1b. After start-up, the temperatures of the molecular sieve B and the catalysts (A and C), are raised by virtue of their contact with the hot exhaust gases emitted from the engine. At time zero (start-up), the flow control device is in the closed position and all of the exhaust gas flows from the light-off catalyst A to the adsorber B, to the burnoff catalyst C, and out through the muffler. The control valve remains in this closed position until the light-off catalyst A has attained its light-off temperature. The system is designed so that the adsorber B does not attain its desorption temperature until the burnoff catalyst C has attained its light-off temperature. After the light-off catalyst has attained its light-off temperature, the control device moves to its second (open) position, diverting most of the exhaust gas away from the adsorber B, and directly to the burnoff catalyst C, or if a three-way catalyst (TWC) is provided, through the TWC to the burnoff catalyst.

We have found that the objects of the invention can be achieved without use of the complex valving and control systems commonly used in such applications. Specifically, the desired objectives can be achieved using a flow control device consisting or a bi-metallic flap or any temperature actuated baffle. Preferably, the flow control device is in the form of a bi-metallic flap which acts as a flow baffle to direct and control the flow of exhaust gas through the adsorber. Preferred embodiments of the invention will now be described with reference to the embodiments shown in the drawings.

Figure 2:
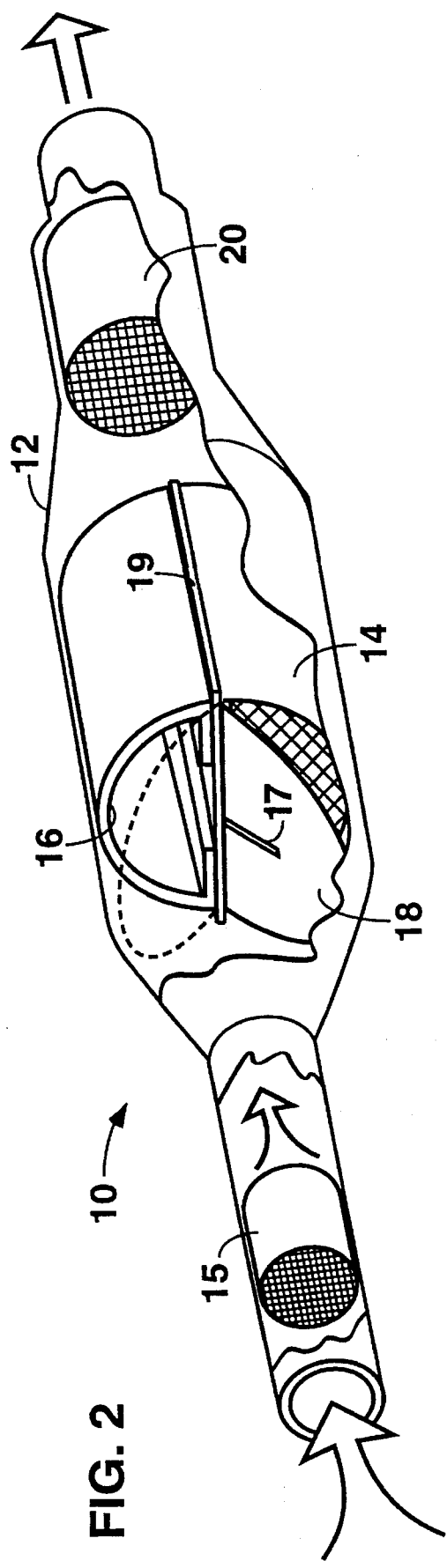
FIG. 2 is a sectional (longitudinal) view of one configuration of the invention in which the adsorber occupies only one half of the housing; and also showing the relative position of the bi-metallic flap.
Figure 6A:
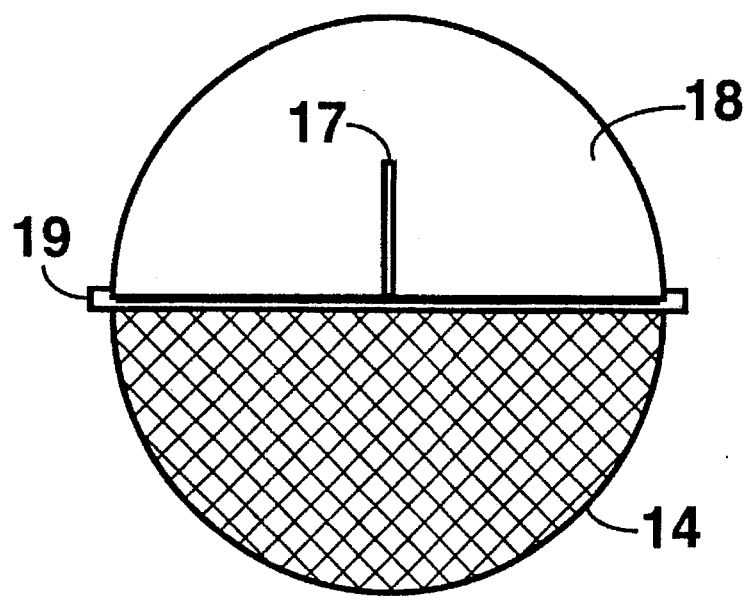
FIGS. 6a and 6b are cross-sectional views of the embodiment of FIG. 2 showing the bi-metallic flap in its closed and open positions respectively.
Figure 6B:
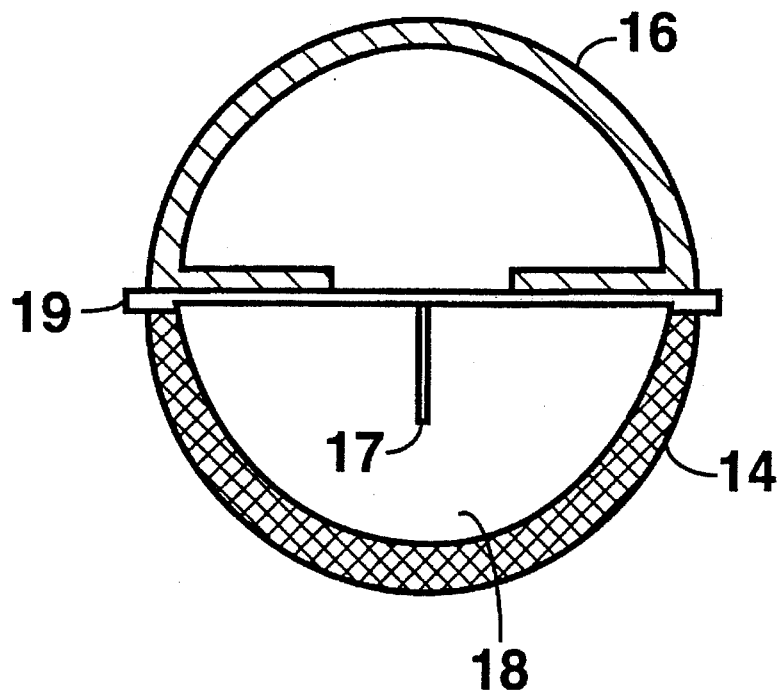

Referring now to FIG. 2, the exhaust system 10 consists of a light-off catalyst 15 and a burnoff catalyst 20, both catalysts separated by a metal housing 12 having disposed therein, an adsorber 14 for trapping hydrocarbons from the exhaust gas stream. Also provided within the housing is an open or free-flow region 16, which forms an unobstructed path from the light-off catalyst 15 to the burn-off catalyst 20. The open of free-flow region is separated from the molecular sieve by means of a metal dividing wall 19 which is fixedly attached or connected to the metal housing, and runs longitudinally from the inlet or upstream end to the outlet or downstream end of the housing. Positioned on the upstream end of the dividing wall 19 is a flow control device 18, which occupies varying positions ranging from the closed to the open position (as illustrated by FIGS. 6a and 6b below), to direct the exhaust stream through the housing 12. The flow control device 18 can be any material which is capable of withstanding the operating temperatures of the exhaust system. In the preferred embodiment, the flow control device 18 is a metal or ceramic flap having attached or connected thereon, a bimetallic strip 17 which is designed to occupy the first (closed) and second (open) positions at predetermined temperatures to achieve desired flow paths. As used herein, for ease of discussion the term bi-metallic flap 18 is used to describe the composite structure of a bi-metallic strip 17, embedded or attached to a metal or ceramic flap.

The meaning of the terms "open" and "closed" when used to describe the position of the bi-metallic flap, is illustrated by FIGS. 6a and 6b using the configuration of FIG. 2. In the first (closed) position (FIG. 6a), control device 18 moves up to cover and block off region 16 thereby effectively directing all or substantially all of the exhaust stream through the absorber 14 where the hydrocarbons in the exhaust stream are trapped. In the second (open) position (FIG. 6b), control device 18 moves down to cover and block off flow through the adsorber 14, thereby effectively directing a substantial portion of the gas stream to the open region 16, while a relatively smaller portion of the gas continues to flow through the adsorber 14.

A portion of the exhaust gas flow is continued through the adsorber in order to bring the adsorber to its desorption temperature. Preferably, a sufficient amount of the exhaust is directed to the adsorber to allow the adsorber to attain its desorption temperature when the burn-off catalyst attains its operating temperature or soon thereafter as illustrated in FIG. 1. The amount of exhaust needed to achieve this goal will vary for each system and must be determined by experimentation. For the embodiments illustrated in the present invention, in the open position, it is desirable that about 5 to 50 percent, preferably, 10–30 percent of the exhaust gas continues to flow through the adsorber to ensure that desorption temperature is attained only when the burn-off catalyst reaches its operating temperature.

Figure 3:
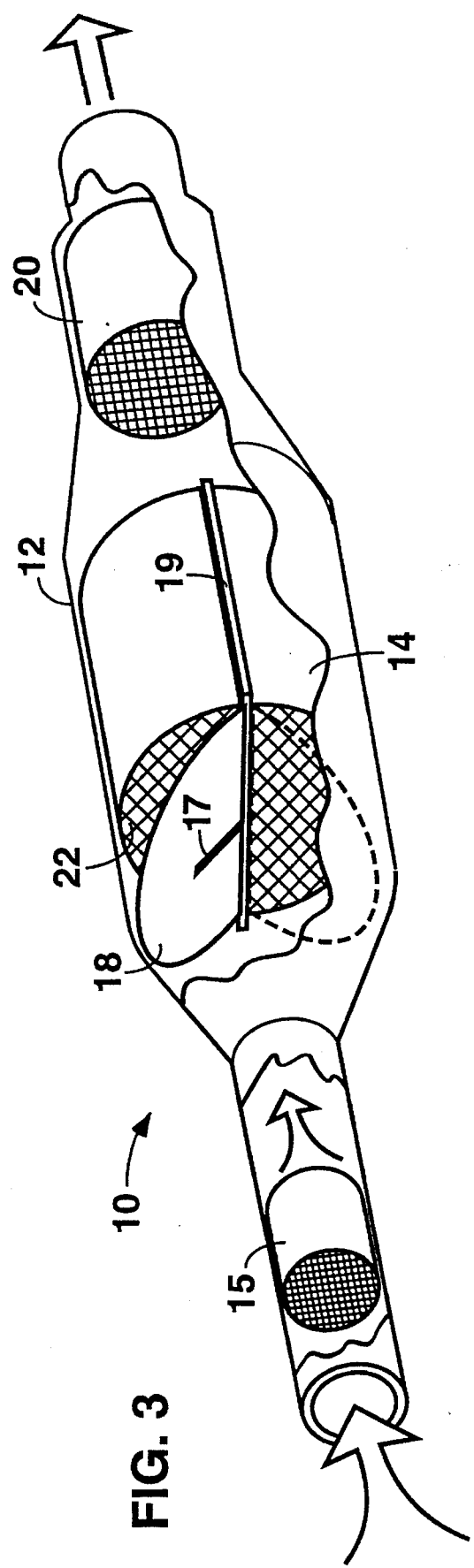
FIG. 3 is a longitudinal view of another embodiment of the configuration of FIG. 2, in which a main catalytic converter or three-way catalyst is placed in the other half of the housing.

FIG. 3 illustrates a modified configuration of the embodiment of FIG. 2 in which a main catalytic converter such as a three-way catalyst (TWC) 22 is disposed in the housing to occupy previously open or free-flow region 16. In this embodiment, the exhaust system functions essentially as described above. At start-up, the control device is in the closed position, and all or substantially all of the exhaust gas stream passes through the light-off converter 15 and into the adsorber 14, where the hydrocarbons in the exhaust stream are adsorbed. This flow path continues until the average or mid-bed temperature of the adsorber is in the range of 80° to 100° C., at which time, the control device 18 moves from the closed position to the open position, thus effectively directing a major portion of the exhaust gas through converter 22, while continuing to direct a smaller portion of the gas through the adsorber as described above. When the flow control device is in the open position, a major or substantial portion of the exhaust stream is directed through the main catalytic converter 22, and from there to the burnoff catalyst 20.

After the temperature rises to a predetermined level, preferably, when the burn-off and/or the main catalysts have attained their effective operating temperatures, the bi-metallic flap moves to a second (open) position to effectively direct most of the exhaust gas through the catalytic converter while continuing to direct a small portion of the gas to the adsorber. As the hot exhaust gas flows through the main catalytic converter it quickly heats the converter to its light-off temperature. The converter then attains its effective operating temperature at which temperature it is able to convert the hydrocarbons in the exhaust stream. Preferably, the amount of the exhaust gas which is allowed to continue to flow through the adsorber is sufficient to bring the adsorber to its desorption temperature as the burn-off catalyst attains its effective operating temperature or soon thereafter, and thereby effect desorption of hydrocarbons from the adsorber. The desorbed hydrocarbons are subsequently converted at the burn-off catalysts.

In the embodiments illustrated in FIGS. 4 and 5, the adsorber 24 consists of a honeycomb structure having a hollow core 26 formed by a tubular dividing wall. In this embodiment, the flow control device 28 is fixedly attached to the tubular dividing wall and occupies a first (closed) position at start-up (FIG. 4), and stays at this position until the molecular sieve mid-bed or average temperature reaches about 80° to 100° C. In the first position all or substantially all of the exhaust gas stream flows through the adsorber 24 where substantially all the hydrocarbon in the gas stream is trapped or adsorbed by the adsorber. When the mid-bed or average temperature of the molecular sieve has reached a predetermined level, the flow control device 28 moves to a second (open) position, FIG. 5, at which a major or substantial portion of the exhaust stream flows through the hollow core 26, while a smaller portion continues to flow through the adsorber 24 to bring the adsorber to its desorption temperature. Heat conduction from this smaller portion of the gas stream which continues to flow through the adsorber, combined with heat from the large portion of gas flowing through the hollow core, slowly heats the adsorber to its desorption temperature. The desorbed hydrocarbon is then passed to the burn-off catalyst 20 for conversion. Preferably, when the flow control device 28 is in the second (open) position, the respective amounts of the exhaust gas flow through the hollow core 26 and the adsorber 24 are appropriately proportioned so that the adsorber 24 reaches its desorption temperature as the burn-off catalyst 20 attains its effective operating temperature, or shortly thereafter.

Useful molecular sieves materials for the invention include silicates (such as the metallosilicates and titanosilicates) of varying silica-alumina ratios, metalloaluminates (such as germaniumaluminates), metallophosphates, aluminophosphates (such as silico- and metalloaluminophosphates (MeAPO), SAPO, McAPSO), gallogerminates and combinations of these. Examples of useful metallosilicates include zeolites, gallosilicates, chromosilicates, borosilicates, ferrisilicates. Examples of zeolites which are particularly useful for the invention include, ZSM-5, Beta, gmelinite, mazzite, offretite, ZSM-12, ZSM-18, Berryllophosphate-H, boggsite, SAPO-40, SAPO-41, and combinations of these, most preferably, ZSM-5, Beta, Ultrastable Y (USY), and mordenite.

It is well known that during cold start, molecular sieve zeolites not only traps hydrocarbons but also causes cracking of some hydrocarbons (i.e., coking). To prevent coking, the adsorber may be catalyzed with suitable catalysts. As is well known in the art, noble metal oxidation catalysts such as platinum, rhodium, and palladium, may be added to zeolite molecular sieve to ensure oxidation of the carbonaceous materials which may result from coking. Any catalyst capable of converting hydrocarbons to water and carbon dioxide may be added to the zeolite. Such catalysts are well known in the art. For example, noble metal catalysts, such as platinum, rhodium, palladium, and mixtures of these are widely used in automotive catalytic converters. These catalysts are capable not only of oxidizing hydrocarbons but also of converting carbon monoxide and NOx in the engine exhaust stream to carbon dioxide and nitrogen. Such catalysts may be incorporated into the adsorber or molecular sieve structure by known methods. It is also known that certain zeolite/noble metal combinations such as disclosed in co-assigned U.S. Pat. No. 5,244,852 (herein incorporated by reference) function as three-way catalysts to convert.

As discussed above, three-way converters which additionally convert NOx and carbon monoxide to non-toxic by-products may also be used in the practice of the invention. Typically, three-way catalysts used in automotive applications comprise noble metals such as platinum and/or palladium, and rhodium. Examples of such catalysts include platinum/palladium/rhodium on gamma alumina with rare earth oxides (e.g., ceria), and platinum on ceria-alumina combined with rhodium on zirconia.

The hydrocarbon trap or molecular sieve structure of the invention, may be utilized in any number of forms. For example, the molecular sieve or zeolite may be utilized directly in the form of beads or pellet, or it may be embedded in, or coated on porous substrates. The molecular sieve material can be applied onto the substrate by any known method such as for example, by conventional washcoat or spraying techniques. In the washcoat technique, the substrate is contacted with a slurry containing the molecular sieve and other components such as temporary binders, permanent binders or precursors, dispersants and other additives as needed. Such methods are well known in the art. The permanent binder in the slurry includes for example, aluminum oxide and its precursors, silica, titania, zirconia, rare earth oxides, and their precursors, spinel and precursors. The molecular sieve slurry is then applied (for example, by repeated spraying or dipping) to the substrate until the desired amount of molecular sieve material has been applied. One useful method for forming zeolite on the surface of a substrate is disclosed in U.S. Pat. No. 3,730,910, herein incorporated by reference.

In one particularly useful embodiment, the molecular sieve is zeolite in the form of a porous monolithic structure formed by extruding the zeolite into a honeycomb structure. U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution, in which the clay in the extrudate crystallizes to form a coherent particle that is essentially all zeolite. Similarly, U.S. Pat. No. 4,637,995, herein incorporated by reference, discloses a method for preparing a monolithic zeolite support comprising a ceramic matrix having zeolite dispersed therein.

Another useful method of forming the molecular sieve structure includes embedding or coating zeolite on a metal, metal alloy, ceramic, or glass ceramic substrate, such as extruded honeycomb substrates, as disclosed in U.S. Pat. No. 4,657,880 herein incorporated by reference.

The adsorber can also be formed by in situ growth of zeolite, that is, by crystallizing zeolite on the surface of a metal, metal alloy, ceramic, or glass ceramic substrate. A method for crystallizing strong-bound zeolites on the surfaces of monolithic ceramic substrates is disclosed in U.S. Pat. No. 4,800,187, herein incorporated by reference.

The substrate can be any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe-Al, Fe-Cr-Al alloys, stainless steel, and Fe-Nickel alloys. U.S. Pat. No. 4,631,267, herein incorporated by reference, discloses a method for producing a monolithic support structure for zeolite by (a) mixing into a substantially homogeneous body (i) a zeolite, (ii) a precursor of a permanent binder for the zeolite selected from the group consisting of alumina precursors, silica precursors, titania precursors, zirconia precursors and mixtures of these, and (iii) a temporary binder; and extruding the mixture to form a porous monolithic molecular sieve structure.

In addition to the embodiments discussed above, it will be clear to persons skilled in the art that numerous modifications and changes can be made to the above invention without departing from its intended spirit and scope.

We claim:

1. An in-line engine exhaust system for a hydrocarbon-containing engine exhaust stream comprising a light-off catalyst, a housing downstream of the light-off catalyst, and a burn-off catalyst downstream of the housing, the burn-off catalyst having a light-off temperature and being capable of converting hydrocarbons to carbon dioxide and water, the housing having an inlet or upstream end, a flow control device located in the upstream end, an outlet or downstream end, and a honeycomb structure having a first and a second region located therein, the first region having disposed therein a molecular sieve structure for adsorbing the hydrocarbons, the molecular sieve structure having a first temperature, the second region located within the first region and comprising an open or free-flow region, the flow control device occupying a first position when the temperature of the molecular sieve is less than a predetermined level and operating to direct substantially all of the exhaust stream to the molecular sieve structure to thereby adsorb the hydrocarbons and thence to the burnoff catalyst, and the flow control device occupying a second position when the molecular sieve temperature is at or above the predetermined level operating to direct a major portion of the exhaust stream to the second region, and a minor portion through the first region and thence to the burn-off catalyst.

2. The exhaust system of claim 1, wherein the predetermined temperature is in the range of 80°–100° C.

3. The exhaust system of claim 1, wherein the flow control device comprises a temperature sensitive bi-metallic flap.

4. The exhaust system of claim 3, wherein the bi-metallic flap occupies the second position after the burn-off catalyst has attained its light-off temperature, and the bi-metallic flap operates to direct a substantial portion of the exhaust stream through the burn-off catalyst and a minor portion of the exhaust through the molecular sieve structure, thence through the burn-off catalyst.

5. The exhaust system of claim 4, wherein the minor portion of exhaust stream is an amount sufficient to bring the molecular sieve structure to its desorption temperature as the burn-off catalyst attains its light-off temperature.

6. The exhaust system of claim 5, wherein the amount of the minor portion of exhaust stream is in the range of 5 to 50% of the total exhaust stream.

7. The exhaust system of claim 6, wherein the amount of the minor portion is in the range of 10 to 30% of the total exhaust stream.

8. The exhaust system of claim 1, wherein the housing further comprises a main catalytic converter disposed in the second region of the housing.

9. The exhaust system of claim 8, wherein the main catalytic converter is a three-way catalyst for converting carbon monoxide, hydrocarbon, and NOx to carbon dioxide, water and nitrogen, the three-way catalyst having a light-off temperature.

10. The exhaust system of claim 1, wherein the molecular sieve structure comprises a washcoat slurry of zeolites and binders, supported on a substrate.

11. The exhaust system of claim 10, wherein the substrate is a honeycomb structure.

12. The exhaust system of claim 1, wherein the adsorber further comprises a catalyst.

13. The exhaust system of claim 1, wherein the molecular sieve structure is a monolithic honeycomb structure.

14. The exhaust system of claim 1, wherein the molecular sieve structure is a zeolite selected from ZSM-5, Beta, ultra-stable Y, mordenite, and combinations of these.

15. The in line engine exhaust system as claimed in claim 1 wherein the first region is located at the periphery of the honeycomb structure and the second region is a hollow core of the honeycomb structure.

* * * * *